(No Model.)

2 Sheets—Sheet 1.

J. H. ANSELL
MACHINE FOR MAKING SPOOLS.

No. 440,734.

Patented Nov. 18, 1890.

Witnesses
Henry Clothier
Geo. H. Townsend

Inventor
John H. Ansell.

(No Model.) 2 Sheets—Sheet 2.

J. H. ANSELL
MACHINE FOR MAKING SPOOLS.

No. 440,734. Patented Nov. 18, 1890.

Witnesses
Henry Clothier
Geo. H. Townsend

Inventor
John H. Ansell.

UNITED STATES PATENT OFFICE.

JOHN H. ANSELL, OF ALPENA, MICHIGAN, ASSIGNOR OF ONE-HALF TO ABRAM R. BLAKELY, OF SAME PLACE.

MACHINE FOR MAKING SPOOLS.

SPECIFICATION forming part of Letters Patent No. 440,734, dated November 18, 1890.

Application filed April 18, 1890. Serial No. 348,580. (No model.)

*To all whom it may concern:*

Be it known that I, JOHN H. ANSELL, a citizen of the United States, residing at Alpena, in the county of Alpena and State of Michigan, have invented a new and useful Machine for Making Spools, of which the following is a full and complete description, reference being had to the accompanying drawings, which form a part of this specification.

The object of my invention is to automatically receive from a hopper or chute suitably-perforated square or cylindrical spool-blanks, force them firmly down upon revolving non-rotating spindles, revolve said spindles with high rotary motion into contact with successive suitable fixed knives, and to remove the finished spool from the spindle.

Figure 1:
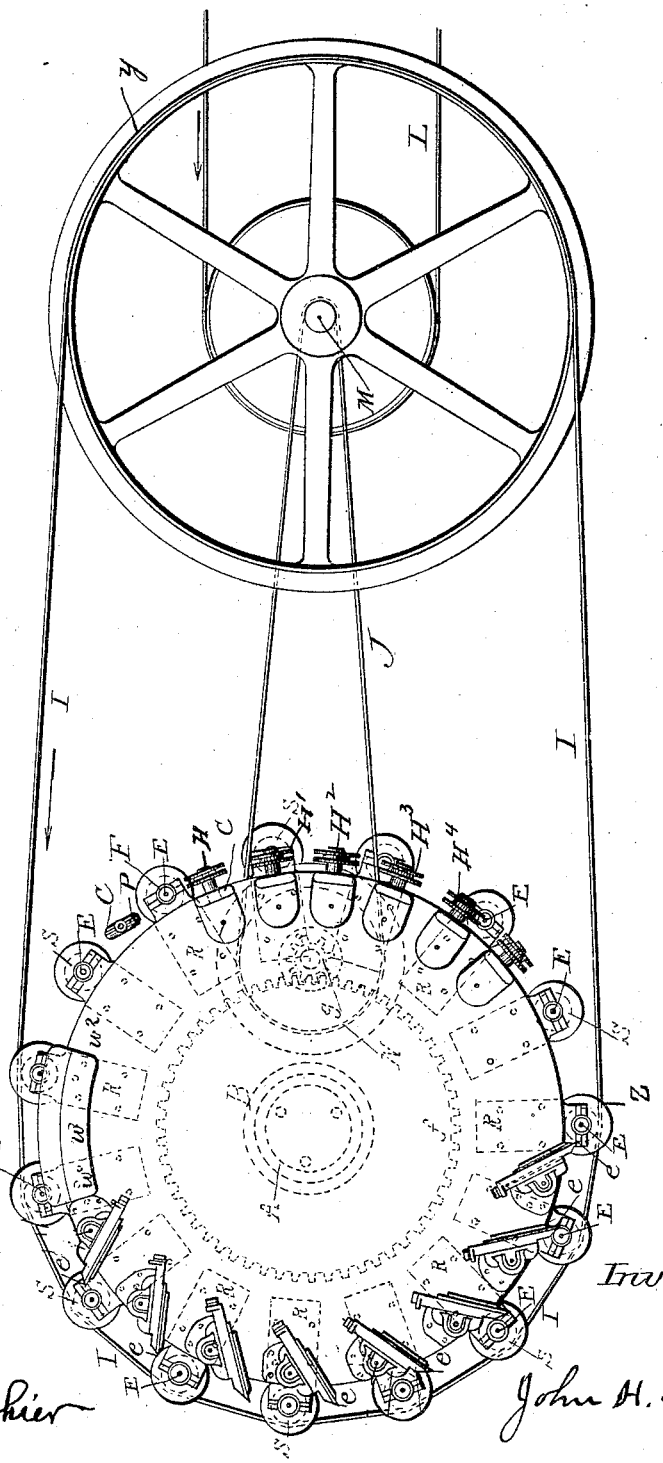
Figure 2:
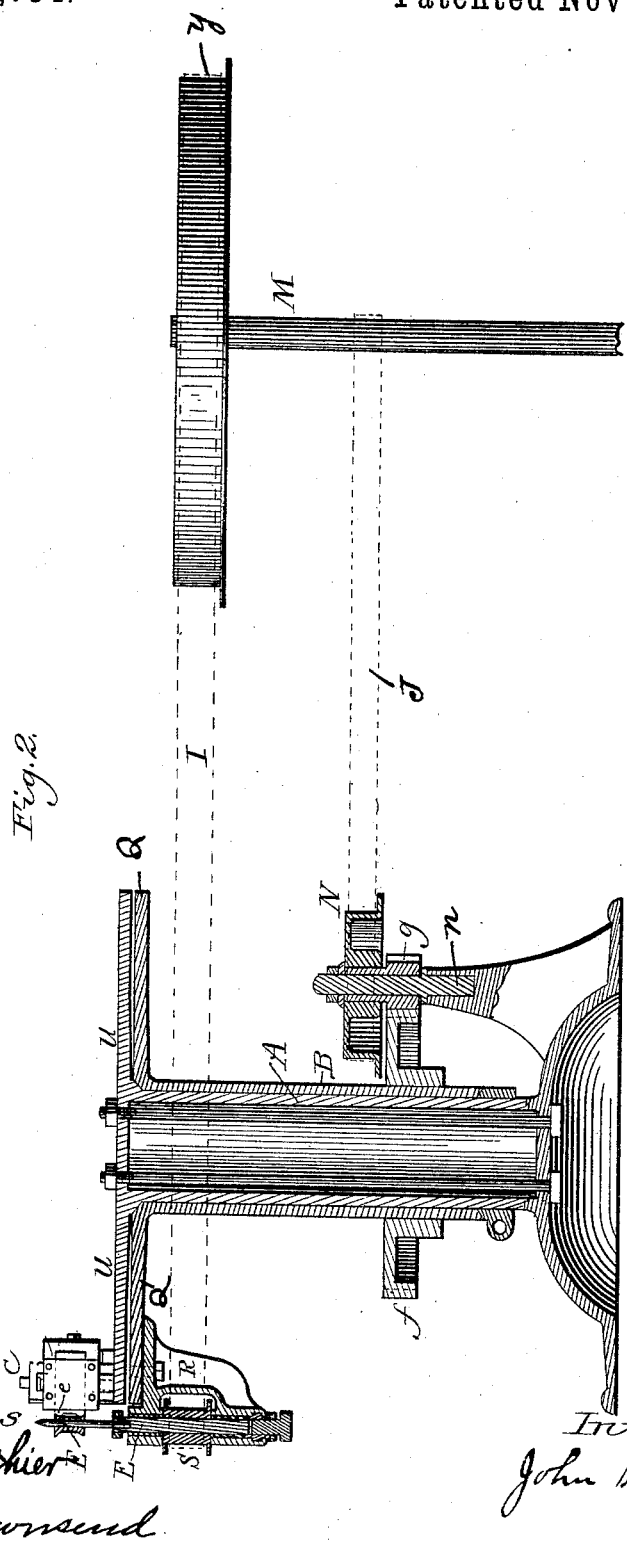

Figure 1 is a plan view of the machine, together with the apparatus by which motion is imparted to the same. Fig. 2 is a vertical section through the center of the machine and through the center of the apparatus by which motion is imparted to the same.

M of both figures is a vertical revolving shaft having about it an endless belt $j$, by which motion is conveyed to pulley N, which pulley N is fixed to the vertical shaft $n$, to which is attached pinion $g$, while $g$ in turn engages spur-gear $f$, attached to the large cylindrical vertical shaft B. At the top of shaft B, and forming an expanded portion of the same, is the revolving table Q, having firmly bolted to its under face one or more brackets R for bearing the spindles E E. To each of said spindles E E is fixed a driven pulley S, by means of which, with belt I, a very high degree of rotary motion is imparted to said spindles. The belt I is driven by the large driving-pulley $y$ at the top of vertical shaft M. A succession of knives $e$, attached to the fixed table U, cut successive increments from the spool-blanks as they are slowly revolved and swiftly rotated past said knives.

C of Fig. 1 is a spool-blank at the outlet of the chute P and in position to be caught upon the point of one of the successive spindles. Said blank, now loosely balanced upon the top of spindle E, is borne forward under roller H, by which it is crowded a trifle down upon the spindle, and as it passes successively under rollers $H^2 H^3 H^4$, &c., it is finally crowded home upon the spindle.

W of Fig. 1 is a wedge fixed to the margin of table U, and having the apex or thin edge at $w$ and thick portion at $w^2$ for the double purpose of pushing or lifting the finished spools from the spindles and for stopping the rotary motion of the spindles just before they arrive at the chute. Each of the knives is adjustable by means of the compound rest attached to the fixed table U.

The operation of my machine is as follows: Motion being imparted to the endless belt J in the direction indicated by the arrow adjacent, it will readily be seen that the revolving table Q will be slowly moved about its axis in a direction, as looked at from above, corresponding with the motion of the hands of a watch; and it will further be seen that as the spindles are successively brought into contact with the swift driving-belt I a swift rotary motion is imparted to them in an opposite direction. Said spindles now being loaded from the chute, as heretofore indicated, they are borne forward until they finally come in contact with belt I at or near Z, at which point they begin to rotate swiftly, and so continue until they have passed all the fixed knives, and finally arrive at wedge W with finished spools. Now, gradually sliding up wedge W, the spool is lifted off, and at the same time the spindle leaves belt I, and the rotary motion is thus stopped and the spindle is thus prepared to receive another blank.

In my invention I do not confine myself to any particular form for the driving-pulley $y$ nor to shaft M, nor to the vertical position of shaft M, nor do I confine myself to the horizontal position of tables U and Q, nor to any particular form or manner of attachment for bracket R, nor knives $e$, nor to any particular form or number of spindles E E, nor to any particular form or number for rollers $H' H^2 H^3$, &c.

Having described my improved spool-machine, what I claim as new, and desire to secure by Letters Patent, is—

1. In a spool-machine, the combination of the chute P, spindles E E, &c., rollers $H' H^2 H^3$, &c., the successive adjustable knives $e$, fixed to table U, inclined plane W, with revolving table Q, substantially as and for the purposes described.

2. In a spool-machine, the combination of the shaft M, endless belt J, pinion $g$, spur-gear $f$, cylindrical shaft B, table Q, brackets R, driven pulleys S, spindles E, with knives $e$, table U, inclined plane W, chute P, rollers H', H², H³, &c., endless belt I, and driving-pulley $y$, as and for the purposes represented and described.

JOHN H. ANSELL.

In presence of—
 HENRY CLOTHIER,
 GEO. H. TOWNSEND.